Feb. 17, 1925.　　　　　　　　　　　　　　　　　1,526,925
C. H. MUCKENHIRN
LIGHT
Filed April 14, 1922　　　2 Sheets-Sheet 1
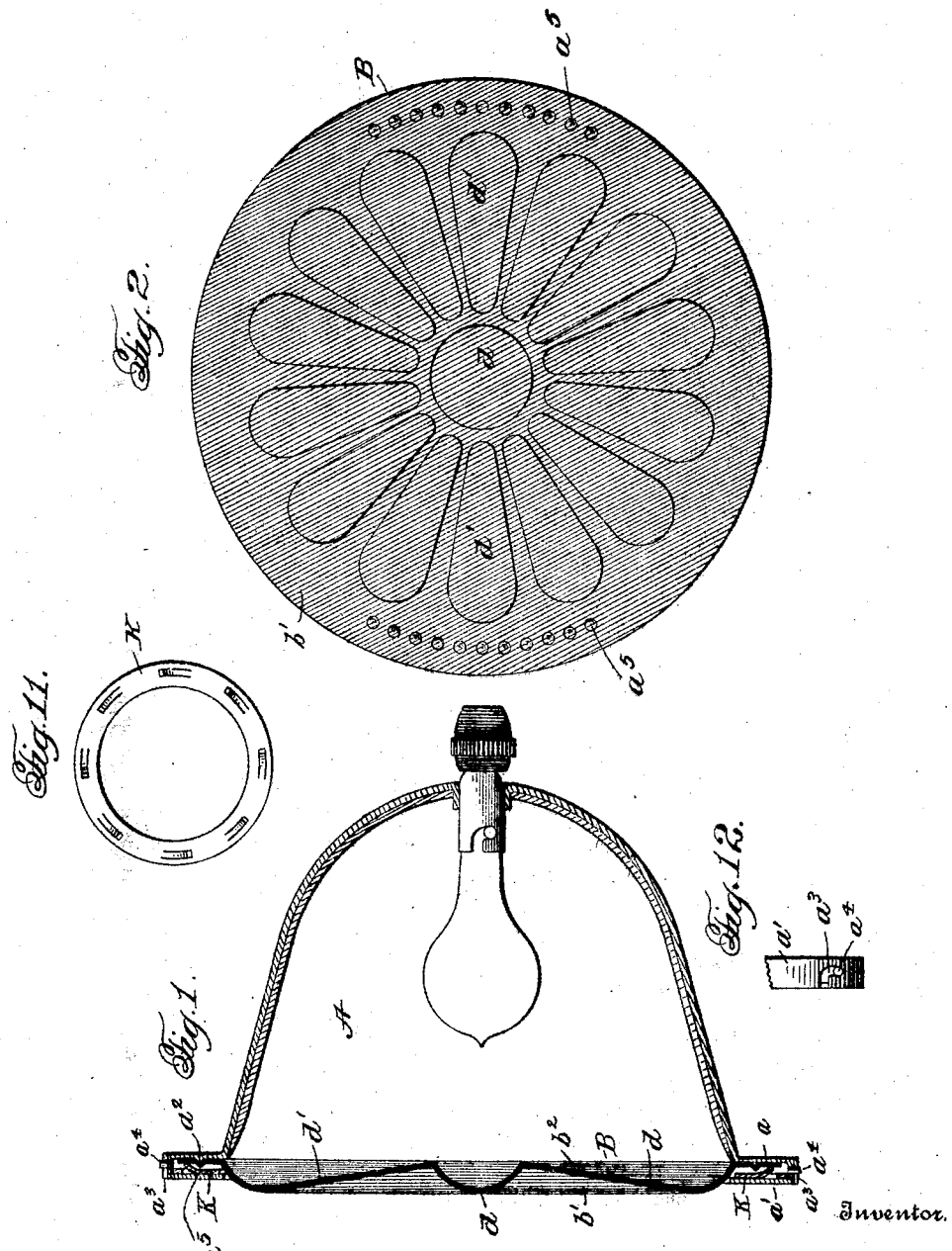
Witness:
Jas. Es. Hutchinson
Inventor.
Charles H. Muckenhirn
By
Milans & Milans　Attorneys Feb. 17, 1925.
C. H. MUCKENHIRN
1,526,925
LIGHT
Filed April 14, 1922  2 Sheets-Sheet 2
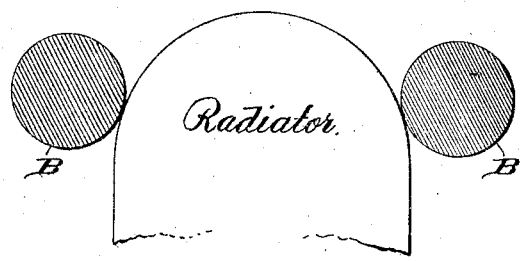
Fig. 3.
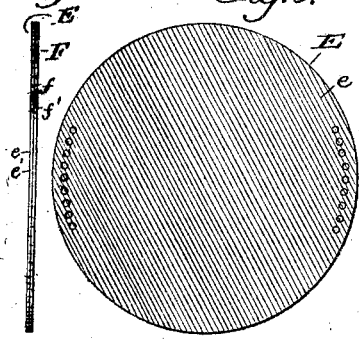
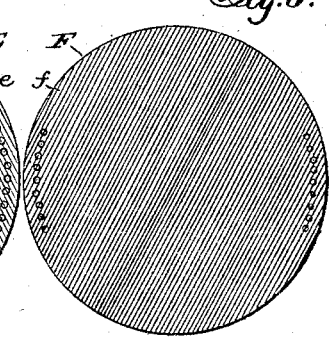
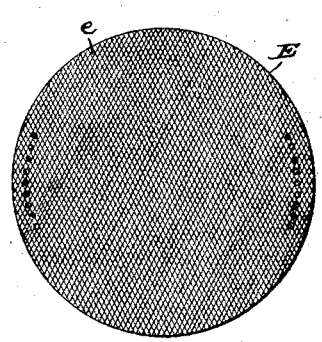
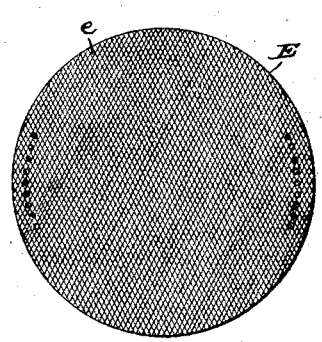
Fig. 4.  Fig. 5.  Fig. 6.  Fig. 7.
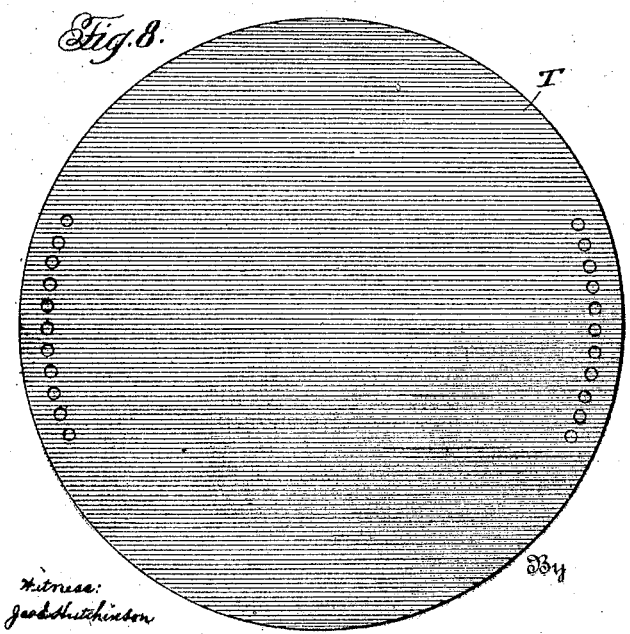
Fig. 8.  Fig. 9.  Fig. 10.
Inventor:
Charles H. Muckenhirn,
Witness:
Jacob Hutchinson
By
Milans & Milans Attorneys Patented Feb. 17, 1925.

1,526,925

UNITED STATES PATENT OFFICE.

CHARLES H. MUCKENHIRN, OF DETROIT, MICHIGAN.

LIGHT.

Application filed April 14, 1922. Serial No. 552,695.

*To all whom it may concern:*

Be it known that I, CHARLES H. MUCKENHIRN, a citizen of the United States, residing at Detroit, in the county of Wayne and State of Michigan, have invented certain new and useful Improvements in Lights, of which the following is a specification, reference being had therein to the accompanying drawing.

This invention relates to an improved front or lens for lights, the same being particularly adapted and advantageous for head lights for motor vehicles, boats, and the like, but also useful in connection with various other kinds of lights employing a front, or in which a front may be desirable such as trouble lamps, tail lights, switch lights, desk and store window lights, etc.

The object of the invention is to provide an improved front or lens of an inexpensive durable character, that will effectually modify the light waves to produce a clear diffused light without glare, and that will provide for the ready regulation of the distribution of the light over certain areas to meet with the requirements in this respect.

The invention, with other objects and advantages thereof, and the particular construction, combination and arrangement of parts comprising the same, will be understood from the following detail description, when considered in connection with the accompanying drawings, forming part hereof, and illustrating embodiments of the invention.

In the drawings:

Figure 1 is a vertical section through a head light equipped with a front or lens constructed and arranged in accordance with the present invention.

Fig. 2 is a detail front elevation of the front or lens.

Fig. 3 is a diagrammatic view showing the usual arrangement of automobile head lamps equipped with my improved front or lens, the front or lenses of the respective head lights being oriented or having their diffracting lines disposed at an angle to control the light in accordance with the present invention.

Fig. 4 is an elevation of a modified form of lens.

Figures 5 and 6 are front elevations of the two members constituting the modified form of front illustrated in Figure 4.

Fig. 7 is a front elevation of the modified construction of front illustrated in Figure 4.

Fig. 8 is a front elevation of another modified construction of front.

Fig. 9 is an edge view of the modified construction illustrated in Figure 8.

Fig. 10 is a detail section, on an enlarged scale of the modified construction illustrated in Figures 8 and 9.

Fig. 11 is a detail view of a clamping ring for the front.

Fig. 12 is a detail view of part of the holding means for the front.

The invention comprehends an improved front or lens provided with a group of parallel diffracting lines, and the orienting of the front or lens as regards its group of diffracting lines, or the arrangement of the same with its group of diffracting lines at different angles whereby the distribution of the light over certain areas may be readily controlled to meet with the requirements in this respect.

The invention further contemplates the use of a special front or lens member in the form of a thin sheet of film like material, such as pyroxylin, celluloid, or the like provided with lines approximating diffracting lines, with means of a simple efficient nature, providing for arranging and positively holding the front or lens member in different positions of adjustment in the lamp as regards its group of diffracting lines.

While specific embodiments of the invention are illustrated in the drawings, it will of course, be understood that changes and variations in the particular construction shown, and the embodiment of the invention in other forms as will appeal to those skilled in the art and falling within the scope of the appended claims may be practiced without departing from the spirit of the invention.

Referring in detail to the particular construction illustrated, Figures 1 to 3 of the drawings, A designates one of the standard forms of head lights having the usual lens clamping means including clamping members $a—a'$. B designates my improved front or lens composed of a thin flexible sheet of pyroxylin, celluloid or like material, having a group of parallel diffracting lines. In the particular construction shown, the front or lens member B is substantially transparent at one side and provided on its other face with diffracting lines formed by parallel scratches, miniature prisms or prismatic parallelograms. $b'$—$b^2$ designate respectively the polished side and the diffracting lines or lined surface, the front or lens member being arranged with its polished surface $b'$ facing to the front. The front or lens B may or may not be provided with diffusing and reinforcing bulges of any suitable form, in the present instance the same being shown with a central bulge $d$ and a series of radially extending elongated pear shaped bulge $d'$.

In addition to the usual clamping members $a$—$a'$ means is provided for arranging and positively holding the front or lens in the head light in different positions of adjustment as regards its group of diffracting lines. The stationary clamping member $a$ of the lamp is provided with a pin or projecting part shown in the form of a small bulge $a^2$, and the front or lens B is provided with a series of bulges $a^5$ in its marginal portion adapted to engage over the projecting part or bulge $a^2$ when the lens is seated between the clamping members. K designates a spring washer interposed between the removable clamping member $a'$ and the marginal portion of the lens. The removable clamping member $a'$ is here shown as provided with bayonet slots $a^3$ to cooperate with pins or projections $a^4$ on the stationary clamping member $a'$. As will be understood, by removing outer clamping member $a'$ and the spring clamping member K, the front or lens member may be readily adjusted and one of its bulges $a^5$ engaged with the projecting part or bulge $a^2$ on the stationary clamping member $a$.

The front or lens B will act to modify the light waves so that a clear diffused light without glare is obtained, the diffracting lines serving to break up and spread the light waves so that the glare producing waves are eliminated, neutralized or charged. If a lens member of this character is arranged with its diffracting lines extending horizontally then the dispersion will be upwardly and downwardly while if arranged with its lines vertically disposed, the light is spread laterally, and held down and restricted as to its vertical area or zone. As will be understood, by orienting the front or lens as regards its group of diffracting lines, or the arrangement of the same with its lines disposed at different angles to the vertical, the direction of dispersion, changing in accordance with the angular adjustment of the group of diffracting lines, can be readily regulated to limit and control the candle power and distribution of the light over certain areas. In the exemplification illustrated diagrammatically Figure 3 of the drawings, the front or lens members B—B are each arranged with its groups of diffracting lines disposed at an angle to the vertical, this arrangement resulting in a reduction of the candle power of the light rays, or the more intense portion thereof at the desired point, known as the D point (a point substantially 52 inches from the ground and 7 feet to the left of the center of the car), the candle power of the rays being increased at points known as the A and B points, the A point being straight ahead of the car and substantially 42 inches from the ground, and the B point straight ahead and 16 inches higher than the A point, the candle power at the A and B points referred to not being restricted by the usual requirements.

In Figures 4 to 7 of the drawings is illustrated a modified arrangement embodying the idea of orienting a lined lens or front, in this modified construction two sheets or members being employed in superposed relation and the members being oriented with relation to each other respecting their groups of diffracting lines, the groups of lines being, in the example shown, disposed at equal angles to the vertical at opposite sides thereof the diffracting lines of the respective members crossing each other. E—F designate the two members, each of substantially the same construction of the lens illustrated Figures 1 and 2, the same being provided with polished surfaces and lined faces $e$—$e'$, $f$—$f'$ respectively. In this instance the sheets or members E—F are shown provided at their marginal portions with apertures, properly spaced to provide for the engagement of the same with a projecting part or bulge $a^2$ on one of the clamping members of the lamp.

One method by which my improved front or lens may be economically manufactured from pyroxylin is as follows: A quantity of pyroxylin in a cake or "heat" form is sliced into sheets. The thickness of the sheets may vary. In practicing the invention, sheets ten one-thousandths of an inch thick and sheets fifteen one-thousandths of an inch thick have been employed. The sheets are simultaneously subjected to high heat and pressure about three thousand pounds pressure per square inch, with a heat about three hundred degrees or more for a period of about fifteen minutes, the sheets being placed between highly polished copper and nickel plated steel plates. A plurality of pressure plates are employed, and the sheets are arranged in pairs between the plates, each pair of sheets being placed together between two of the pressure plates. This treatment of two sheets together between the highly polished surfaces of two pressure plates results in giving the sheets a high polish on their outer sides which are next to the polished surfaces of the pressure plates, and lined surfaces at their opposing inner sides, the marks made by the minute indentations of the cutting or slicing knife during the sheeting operation being brought out in this way, and resulting in a surface formed of parallel scratches, miniature prisms, or miniature prismatic parallelograms. The sheets may be readily provided with diffusing protuberances or points by forming the bulges under a temperature slightly lower than the temperature at which the sheets have been previously heated, a temperature sufficient to soften the sheet but not enough to affect the polished and lined surfaces thereof.

In Figures 8, 9 and 10 of the drawings, a modified form of front or lens member is shown said lens member having a lined surface T at one side thereof provided by closely associated fine corrugations formed by pressing.

It will be noted that the orienting of the front or lens affords a wide range of control and the special construction and arrangement of parts is of a simple, efficient nature providing for the quick and easy orienting of the lens members.

What I claim is:

1. The combination with a head light, a front therefor, composed of a film like body having a group of parallel lines approximating diffracting lines, and means for supporting the lens member in place in the head light in different positions of adjustment with its group of diffracting lines extending at different angles, said means including a stud on the head light, and said lens member being provided with a plurality of indentations at its marginal portion to engage over said stud.

2. The combination with a head light, of a front therefor including two superimposed members of film like material, each of said members having parallel lines approximating diffracting lines, and means for supporting said members in the head light in different positions of adjustment relatively to each other respecting the angular disposition of their groups of diffracting lines.

In testimony whereof I hereunto affix my signature in the presence of two witnesses.

CHARLES H. MUCKENHIRN.

Witnesses:
  GEO. D. RILEY,
  GERTRUDE WEDEMEIER.